US012334014B2

(12) United States Patent
Pyo et al.

(10) Patent No.: US 12,334,014 B2
(45) Date of Patent: Jun. 17, 2025

(54) DISPLAY DEVICE AND METHOD OF DRIVING THE SAME

(71) Applicant: SAMSUNG DISPLAY CO., LTD., Yongin-si (KR)

(72) Inventors: Si Beak Pyo, Yongin-si (KR); Seung Kyu Lee, Yongin-si (KR); Ji Hye Moon, Yongin-si (KR); Young Kyo Seo, Yongin-si (KR); Sung Jin Kim, Yongin-si (KR); Hyun Seok Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/401,129

(22) Filed: Dec. 29, 2023

(65) Prior Publication Data

US 2024/0347002 A1 Oct. 17, 2024

(30) Foreign Application Priority Data

Apr. 12, 2023 (KR) ........................ 10-2023-0048388

(51) Int. Cl.
*G09G 3/3233* (2016.01)

(52) U.S. Cl.
CPC ... *G09G 3/3233* (2013.01); *G09G 2300/0452* (2013.01); *G09G 2300/0819* (2013.01); *G09G 2300/0842* (2013.01); *G09G 2310/08* (2013.01); *G09G 2320/0238* (2013.01); *G09G 2320/041* (2013.01)

(58) Field of Classification Search
None
See application file for complete search history.

(56) References Cited

U.S. PATENT DOCUMENTS

| | | | | |
|---|---|---|---|---|
| 9,953,573 | B2 | 4/2018 | Pyo et al. | |
| 10,810,942 | B2 | 10/2020 | Pyo et al. | |
| 10,997,909 | B2 | 5/2021 | Pyo et al. | |
| 11,017,727 | B2 | 5/2021 | Pyo | |
| 11,302,238 | B2 | 4/2022 | Pyo et al. | |
| 2018/0174525 | A1 * | 6/2018 | Kim | G09G 3/3291 |
| 2019/0213958 | A1 * | 7/2019 | Cho | G09G 3/3266 |

FOREIGN PATENT DOCUMENTS

| | | |
|---|---|---|
| CN | 111445847 | 4/2022 |

* cited by examiner

*Primary Examiner* — Ifedayo B Iluyomade
(74) *Attorney, Agent, or Firm* — F. CHAU & ASSOCIATES, LLC

(57) ABSTRACT

A display device includes a plurality of first pixels disposed in a first pixel area and initialized by a voltage of a first initialization power source, a plurality of second pixels disposed in a second pixel area and initialized by a voltage of a second initialization power source different from the first initialization power source, a data driver that supplies a data signal to a plurality of data lines connected to the first pixels and the second pixels, and a scan driver that supplies a scan signal to a plurality of scan lines connected to the first pixels and the second pixels. A black data signal supplied from the data driver to the first pixels and a black data signal supplied from the data driver to the second pixels are set to the same voltage.

16 Claims, 10 Drawing Sheets

DISPLAY DEVICE AND METHOD OF DRIVING THE SAME

CROSS-REFERENCE TO RELATED APPLICATION

The application claims priority under 35 U.S.C. § 119 to Korean Patent Application No. 10-2023-0048388, filed on Apr. 12, 2023, the disclosure of which is incorporated by reference herein in its entirety.

TECHNICAL FIELD

Embodiments of the present inventive concept relate to a display device and a method of driving the same.

DISCUSSION OF RELATED ART

A display device may display an image using pixels (or a pixel circuit). The display device may include a sensor, a camera, and the like disposed on a bezel (or edge portion) of the front side of the display device. For example, the display device may recognize an object using an optical sensor and may acquire a still image and a moving image using a camera.

The sensor, the camera and the like may be disposed to overlap a pixel area instead of the bezel to reduce the size of the bezel. To improve the transmittance in an area where the camera is disposed, the resolution in an overlapping area may be designed to be smaller than other areas. However, the desired black luminance may not be implemented in the area where the resolution is designed to be small.

SUMMARY

An object of the present inventive concept is to provide a display device and a method of driving the same that can realize the desired black luminance in a first pixel area by supplying different initialization power sources to a first pixel area having a relatively low resolution and a second pixel area having a relatively high resolution.

A display device according to embodiments of the present inventive concept may include a plurality of first pixels disposed in a first pixel area and initialized by a voltage of a first initialization power source, a plurality of second pixels disposed in a second pixel area and initialized by a voltage of a second initialization power source different from the first initialization power source, a data driver that supplies a data signal to a plurality of data lines connected to the first pixels and the second pixels, and a scan driver that supplies a scan signal to a plurality of scan lines connected to the first pixels and the second pixels. A black data signal supplied from the data driver to the first pixels and a black data signal supplied from the data driver to the second pixels may be set to a same voltage.

According to an embodiment, the number of the first pixels disposed per unit area may be less than the number of the second pixels disposed per unit area.

According to an embodiment, the first initialization power source may be set to a lower voltage than the second initialization power source.

According to an embodiment, the scan driver may generate the scan signal supplied to the first pixels and the second pixels using a same gate-off voltage.

According to an embodiment, each of the first pixels and the second pixels may include a light emitting element having a second electrode connected to a second power source line to which a second driving power source is supplied, a first transistor that controls the amount of current supplied from a first driving power source of a first power source line connected to a first electrode to the second power source line via the light emitting element, a second transistor connected between a data line among the plurality of data lines and the first electrode of the first transistor and having a gate electrode connected to a first scan line among the plurality of scan lines, and a third transistor connected between a first electrode of the light emitting element and a third power source line.

According to an embodiment, the first initialization power source may be supplied to the third power source line of a first pixel among the plurality of first pixels, and the second initialization power source may be supplied to the third power source line of a second pixel among the plurality of second pixels.

According to an embodiment, the first initialization power source may be set to a lower voltage than the second driving power source.

According to an embodiment, each of the first pixels and the second pixels may include a fourth transistor connected between a gate electrode of the first transistor and a fourth power source line to which a voltage of a third initialization power source is supplied, and having a gate electrode connected to a third scan line among the plurality of scan lines, a fifth transistor connected between the gate electrode of the first transistor and a second electrode of the first transistor, and having a gate electrode connected to a second scan line among the plurality of scan lines, a sixth transistor connected between the first power source line and the first electrode of the first transistor, and having a gate electrode connected to an emission control line, a seventh transistor connected between the second electrode of the first transistor and the first electrode of the light emitting element, and having a gate electrode connected to the emission control line, and a storage capacitor connected between the gate electrode of the first transistor and the first power source line.

According to an embodiment, the first pixels may include pixels of a first color and pixels of a second color.

According to an embodiment, the voltage of the first initialization power source supplied to the pixels of the first color and the voltage of the first initialization power source supplied to the pixels of the second color may be set to be different from each other.

According to an embodiment, the voltage of the first initialization power source supplied to the pixels of the first color and the voltage of the first initialization power source supplied to the pixels of the second color may be set to be different from each other in response to a temperature.

According to an embodiment, each of the voltage of the first initialization power source supplied to the pixels of the first color and the voltage of the first initialization power source supplied to the pixels of the second color may be set to a lower voltage as the temperature increases.

According to an embodiment, the first pixels may further include pixels of a third color, and the voltage of the first initialization power source supplied to the pixels of the third color may be set to be different from the voltage of the first initialization power source supplied to the pixels of the first color and the voltage of the first initialization power source supplied to the pixels of the second color.

A method of driving a display device according to embodiments of the present inventive concept may include initializing a light emitting element included in each of a plurality of first pixels disposed in a first pixel area while supplying a voltage of a first initialization power source, and initializing a light emitting element included in each of second pixels disposed in a second pixel area while supplying a voltage of a second initialization power source different from the first initialization power source. A voltage of a black data signal supplied to the first pixels and a voltage of a black data signal supplied to the second pixels may be set to be the same.

According to an embodiment, the number of the first pixels disposed per unit area may be less than the number of the second pixels disposed per unit area.

According to an embodiment, the first initialization power source may be set to a lower voltage than the second initialization power source.

According to an embodiment, a scan signal supplied to the first pixels and a scan signal supplied to the second pixels may be generated by a same gate-off voltage.

According to an embodiment, each of the first pixels may implement a luminance while controlling an amount of current flowing from a voltage of a first driving power source to a second driving power source via the light emitting element, and the first initialization power source may be set to a lower voltage than the second driving power source.

According to an embodiment, the first pixels may include pixels of a first color and pixels of a second color, and the voltage of the first initialization power source supplied to the pixels of the first color and the voltage of the first initialization power source supplied to the pixels of the second color may be set to be different from each other.

According to an embodiment, the voltage of the first initialization power source supplied to the pixels of the first color and the voltage of the first initialization power source supplied to the pixels of the second color may be set to a lower voltage as temperature increases.

Objects of the present inventive concept are not limited to the objects mentioned above, and other technical objects not mentioned will be clearly understood by those skilled in the art from the description below.

BRIEF DESCRIPTION OF THE DRAWINGS

The above and other features of the present inventive concept will become more apparent by describing in detail embodiments thereof with reference to the accompanying drawings.

DETAILED DESCRIPTION OF THE EMBODIMENTS

Figure 1:
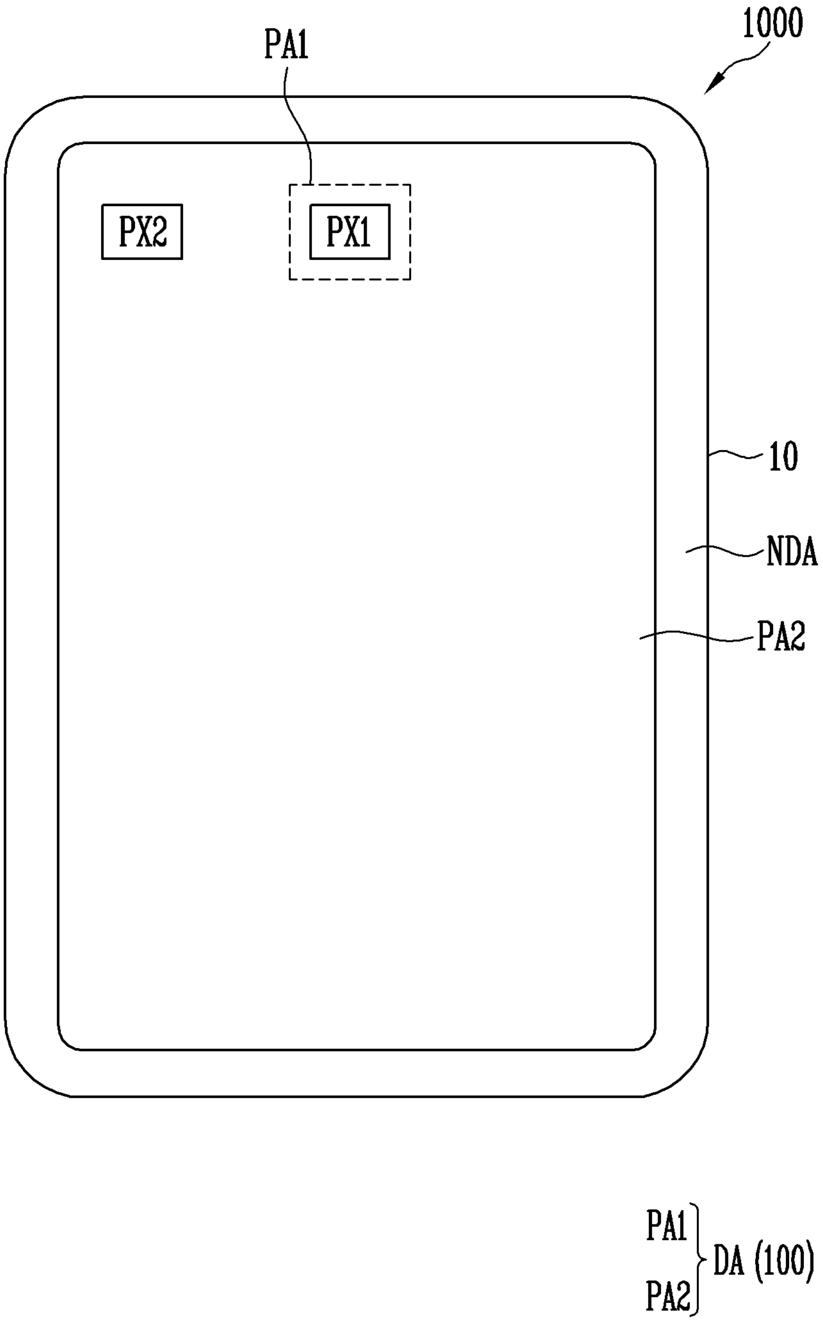
FIG. 1 is a diagram illustrating a display device according to an embodiment of the present inventive concept.

Embodiments of the present inventive concept will be described more fully hereinafter with reference to the accompanying drawings. Like reference numerals may refer to like elements throughout the accompanying drawings.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, and may optionally be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

The term "connection" between two components may mean that both of an electrical connection and a physical connection are used inclusively, but the present inventive concept is not limited thereto. For example, "connection" used based on a circuit diagram may mean an electrical connection, and "connection" used based on a cross-sectional view and a plan view may mean a physical connection.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, and that features or aspects within the embodiments may be combined, unless the context clearly indicates otherwise.

As used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Figure 2:
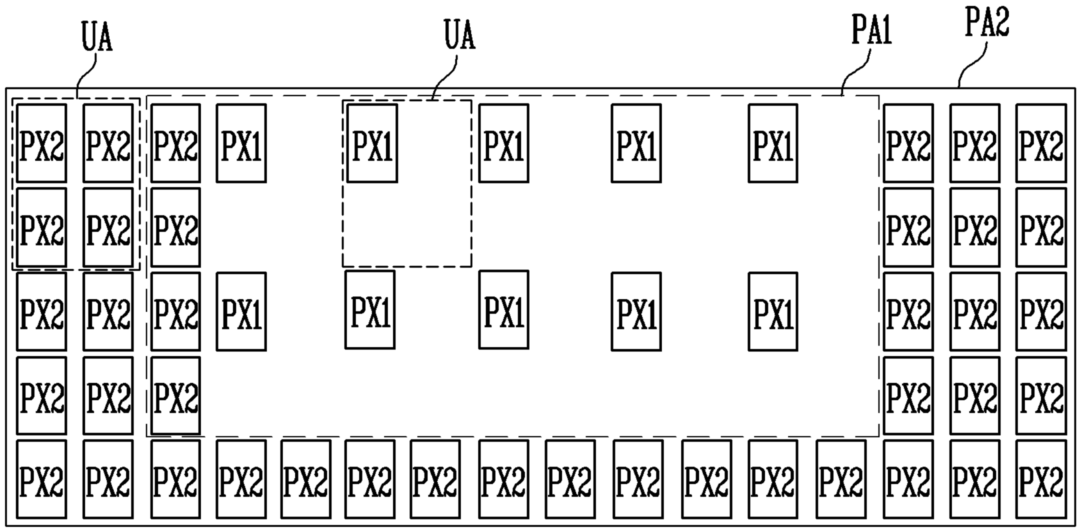
FIG. 2 is a diagram illustrating an embodiment of a portion of a pixel unit of the display device of FIG. 1.

FIG. 1 is a diagram illustrating a display device according to an embodiment of the present inventive concept. FIG. 2 is a diagram illustrating an embodiment of a portion of a pixel unit of the display device of FIG. 1.

Referring to FIGS. 1 and 2, a display device 1000 may include a display panel 10 including a pixel unit 100.

The display panel 10 may include a display area DA and a non-display area NDA. Pixels PX1 and PX2 may be disposed in the display area DA, and various drivers that drive the pixels PX1 and PX2 may be disposed in the non-display area NDA.

The display area DA may correspond to the pixel unit 100 including a plurality of pixels PX1 and PX2. The pixel unit 100 may include a first pixel area PA1 and a second pixel area PA2. First pixels PX1 may be disposed in the first pixel area PA1, and second pixels PX2 may be disposed in the second pixel area PA2.

In an embodiment, a size of a driving transistor included in a first pixel PX1 (for example, a ratio of a channel width to a channel length) may be different from a size of a driving transistor included in a second pixel PX2 (for example, a ratio of a channel width to a channel length).

In an embodiment, as shown in FIG. 2, the number (density) of the first pixels PX1 disposed per unit area UA may be less than the number (density) of the second pixels PX2. For example, one first pixel PX1 may be disposed per unit area UA, and four second pixels PX2 may be disposed per unit area UA. Therefore, the resolution of the first pixel area PA1 may be lower than that of the second pixel area PA2.

Since an aperture ratio of the first pixel area PA1 is higher than that of the second pixel area PA2, a camera, an optical sensor, and the like may be disposed to overlap the first pixel area PA1. The optical sensor may include a biometric information sensor such as, for example, a fingerprint sensor, an iris recognition sensor, and an artery sensor. However, the optical sensor is not limited thereto. For example, according to embodiments, the optical sensor of a light detection method may include a gesture sensor, a motion sensor, a proximity sensor, an illuminance sensor, an image sensor, and the like.

Compared to the second pixel PX2, the first pixel PX1 may supply more driving current corresponding to the same voltage. In this case, when a general grayscale is displayed corresponding to a data signal, the same or similar luminance may be implemented in the first pixel area PA1 and the second pixel area PA2. Alternatively, the same or similar luminance may be implemented in the first pixel area PA1 and the second pixel area PA2 by supplying data signals of different voltages to the first pixels PX1 and the second pixels PX2 in response to the same grayscale.

In an embodiment, when a voltage of a black data signal is set based on the second pixel PX2, it may be difficult to implement black luminance in the first pixel PX1. As an example, when the black data signal of the same voltage is supplied to the first pixel PX1 and the second pixel PX2, light having a higher luminance may be generated in the first pixel PX1 than in the second pixel PX2.

To account for this, embodiments of the present inventive concept provide a method of setting a voltage of the black data signal based on the first pixel PX1. For example, the black data signal generated based on the first pixel PX1 may be set to a higher voltage than the black data signal generated based on the second pixel PX2. A driving power source AVDD (refer to FIG. 3) that generates a gamma voltage and the like may be set to a higher voltage than the black data signal. Accordingly, when the voltage of the black data signal increases, power consumption may increase.

In addition, embodiments of the present inventive concept provide a method of supplying black data signals of different voltages to the first pixel area PA1 and the second pixel area PA2. In this case, scan signals of different gate-off voltages VGH (refer to FIG. 3) are supplied to the first pixel area PA1 and the second pixel area PA2, and different driving power sources AVDD are supplied to each area PA1 or PA2.

In the display device 1000 according to embodiments of the present inventive concept, the black data signal (for example, the black data signal set based on the second pixel PX2) of the same voltage may be supplied to the first pixels PX1 and the second pixels PX2, and initialization power sources Vint1 and Vint2 of different voltages (refer to FIG. 3) may be supplied to the first pixels PX1 and the second pixels PX2. In this case, the desired black luminance may be implemented in each of the first pixels PX1 and the second pixels PX2 in response to the black data signal of the same voltage.

Figure 3:
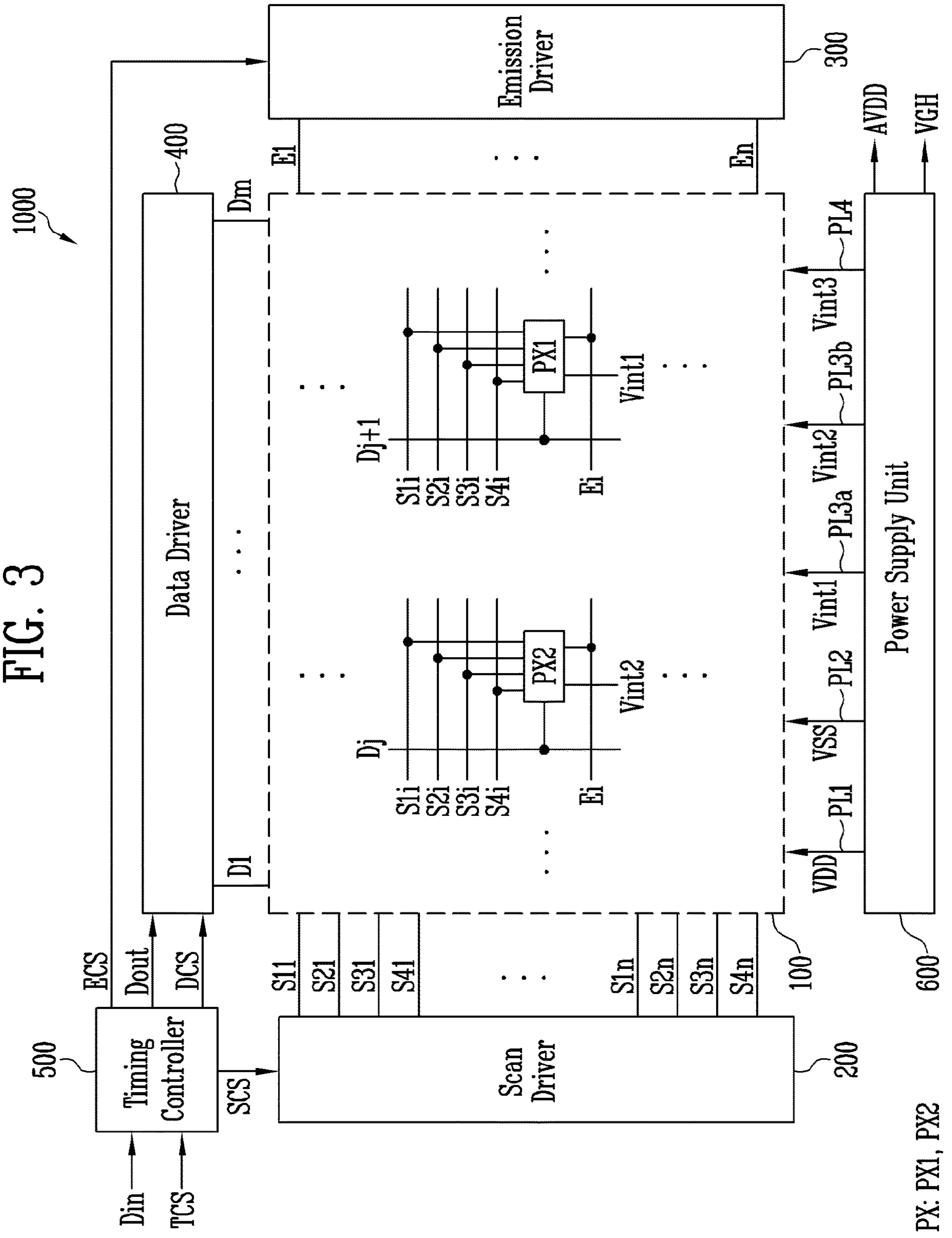
FIG. 3 is a diagram illustrating a display device according to an embodiment of the present inventive concept.

FIG. 3 is a diagram illustrating a display device according to an embodiment of the present inventive concept.

Referring to FIG. 3, the display device 1000 according to embodiments of the present inventive concept includes the pixel unit 100, a scan driver 200, an emission driver 300, a data driver 400, a timing controller 500, and a power supply unit 600.

The pixel unit 100 may include scan lines S11 to S1*n*, S21 to S2*n*, S31 to S3*n*, and S41 to S4*n*, emission control lines E1 to En, and data lines D1 to Dm, where n and m are positive integers. Each of the pixels PX may include a driving transistor and a plurality of switching transistors.

In an embodiment, the pixel unit 100 may include the first pixel area PA1 and the second pixel area PA2 described with reference to FIGS. 1 and 2. The first pixel area PA1 may include the first pixels PX1, and the second pixel area PA2 may include the second pixels PX2. The first pixels PX1 and the second pixels PX2 may have substantially the same structure.

The timing controller 500 may receive input data Din and a timing control signal TCS from a host system such as, for example, an application processor (AP) through a predetermined interface. The timing controller 500 may generate a first control signal SCS, a second control signal ECS, and a third control signal DCS in response to the timing control signal TCS. The first control signal SCS may be supplied to the scan driver 200, the second control signal ECS may be supplied to the emission driver 300, and the third control signal DCS may be supplied to the data driver 400. The timing controller 500 may rearrange and/or correct the input data Din supplied from outside of the display device 1000 to generate output data Dout and supply the output data Dout to the data driver 400.

The scan driver 200 may receive the first control signal SCS from the timing controller 500 and supply a first scan signal, a second scan signal, a third scan signal, and a fourth scan signal to first scan lines S11 to S1*n*, second scan lines S21 to S2*n*, third scan lines S31 to S3*n*, and fourth scan lines S41 to S4*n*, respectively, based on the first control signal SCS. Here, the second scan lines S21 to S2*n* may be set as the same scan lines as the first scan lines S11 to S1*n*, and the fourth scan lines S41 to S4*n* may be set as the same scan lines as the third scan lines S31 to S3*n*. Also, the fourth scan lines S41 to S4*n* may be set as the same scan lines as the first scan lines S11 to S1*n*.

The first to fourth scan signals may be set to gate-on voltages corresponding to types of transistors to which corresponding scan signals are supplied. A transistor that receives the scan signal may be set to a turned-on state when the scan signal is supplied. For example, a gate-on voltage of the scan signal supplied to a P-channel metal oxide semiconductor (PMOS) transistor may be a logic low level, and a gate-on voltage of the scan signal supplied to an N-channel metal oxide semiconductor (NMOS) transistor may be a logic high level. Hereinafter, the expression “a scan signal is supplied” may be understood as that the scan signal is supplied at a logic level that turns on a transistor controlled thereby.

In addition, the scan driver 200 may supply a gate-off voltage VGH to the first scan lines S11 to S1*n*, the second scan lines S21 to S2*n*, the third scan lines S31 to S3*n*, and the fourth scan lines S41 to S4*n* when the first scan signal, the second scan signal, the third scan signal, and the fourth scan signal are not supplied. The gate-off voltage VGH may be set to a voltage at which transistors connected to the first scan lines S11 to S1*n*, the second scan lines S21 to S2*n*, the third scan lines S31 to S3*n*, and the fourth scan lines S41 to S4*n* are turned off. In an embodiment, the scan driver 200 may supply the same gate-off voltage VGH to the first pixel PX1 and the second pixel PX2.

The emission driver 300 may receive the second control signal ECS from the timing controller 500 and supply an emission control signal to the emission control lines E1 to En based on the second control signal ECS. For example, the emission driver 300 may sequentially supply the emission control signal to the emission control lines E1 to En. The emission control signal may be generated by the gate-off voltage VGH, and a transistor that receives the emission control signal may be turned off. Hereinafter, the expression “an emission control signal is supplied” may be understood as that the emission control signal is supplied at a logic level that turns off the transistor controlled thereby.

FIG. 3 shows the scan driver 200 composed of a single component for convenience of description, but embodiments of the present inventive concept are not limited thereto. For example, depending on the design, the scan driver 200 may include a plurality of scan drivers each supplying at least one of the first to fourth scan signals. Also, at least a part of the scan driver 200 and the emission driver 300 may be integrated into one driving circuit, module, or the like.

The data driver 400 may receive the third control signal DCS and the output data Dout from the timing controller 500. The data driver 400 may convert the output data Dout of a digital form into the data signal (or data voltage) of an analog form in response to the control of the data control signal DCS. The data driver 400 may supply the data signal to the data lines D1 to Dm in response to the third control signal DCS. As an example, the data driver 400 may supply the data signal to the data lines D1 to Dm in synchronization with the first scan signal supplied to the first scan lines S11 to S1*n*.

The data driver 400 may supply the black data signal of the same voltage to the first pixel PX1 and the second pixel PX2. The data driver 400 may generate a gamma voltage using a voltage of the driving power source AVDD and generate the data signal using the gamma voltage. Here, the data driver 400 may generate the black data signal to be supplied to the first pixel PX1 and the second pixel PX2 using any one gamma voltage set based on the second pixel PX2. Additionally, in embodiments, the display device 1000 may further include a gamma driver that generates the gamma voltage using the voltage of the driving power source AVDD and supplies the generated gamma voltage to the data driver 400.

The power supply unit 600 may generate a first driving power source VDD, a second driving power source VSS, a first initialization power source Vint1, a second initialization power source Vint2, a third initialization power source Vint3, the gate-off voltage VGH, and the driving power source AVDD.

The gate-off voltage VGH may be supplied to the scan driver 200 and/or the emission driver 300. The gate-off voltage VGH may be set to a voltage at which the transistor included in the pixel PX can be turned off. The driving power source AVDD may be supplied to the data driver 400. The driving power source AVDD may be used to generate the gamma voltage. Additionally, the driving power source AVDD may generate various voltages utilized to drive the display device 1000 and may be additionally supplied to various components of the display device 1000.

The first driving power source VDD may be supplied to the pixels PX via a first power source line PL1. The second driving power source VSS may be supplied to the pixels PX via a second power source line PL2. The first initialization power source Vint1 may be supplied to the first pixels PX1 via a third power source line (or 3*a*-th power source line) PL3*a*. The second initialization power source Vint2 may be supplied to the second pixels PX2 via a third power source line (or 3*b*-th power source line) PL3*b*. The third initialization power source Vint3 may be supplied to the pixels PX via a fourth power source line PL4.

In an embodiment, the first pixels PX1 and the second pixels PX2 may be commonly connected to the first power source line PL1, the second power source line PL2, and the fourth power source line PL4. Also, the first pixels PX1 may be connected to the 3*a*-th power source line PL3*a*, and the second pixels PX2 may be connected to the 3*b*-th power source line PL3*b*. That is, the first pixel PX1 may receive a voltage of the first initialization power source Vint1, and the second pixel PX2 may receive a voltage of the second initialization power source Vint2.

The first initialization power source Vint1 may be a voltage that initializes a first electrode (or anode electrode) of a light emitting element included in the first pixel PX1. The voltage of the second initialization power source Vint2 may be a voltage that initializes a first electrode of a light emitting element included in the second pixel PX2. The first initialization power source Vint1 and the second initialization power source Vint2 may be set to different voltages. As an example, the first initialization power source Vint1 may be set to a lower voltage than the second initialization power source Vint2. In an embodiment of the present inventive concept, the first initialization power source Vint1 may be set to a lower voltage than the second initialization power source Vint2. Accordingly, the desired black luminance (or the black luminance similar to or equal to that of the second pixel PX2) may be implemented in the first pixel PX1.

Figure 4:
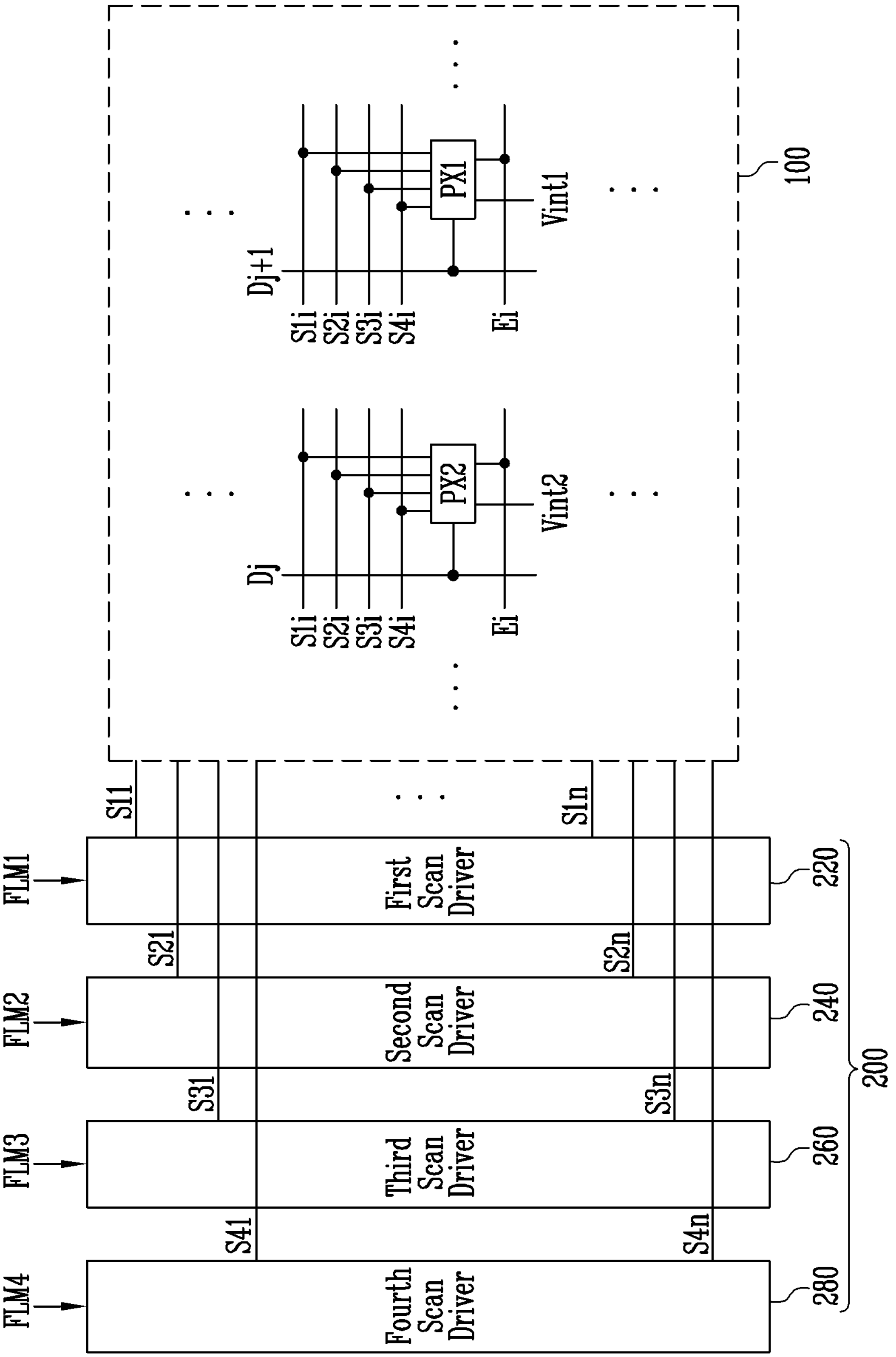
FIG. 4 is a diagram illustrating an embodiment of a scan driver included in the display device of FIG. 3.

FIG. 4 is a diagram illustrating an embodiment of a scan driver included in the display device of FIG. 3.

Referring to FIG. 4, the scan driver 200 according to an embodiment of the present inventive concept may include a first scan driver 220, a second scan driver 240, a third scan driver 260, and a fourth scan driver 280.

The first control signal SCS may include first to fourth scan start signals FLM1 to FLM4. The first to fourth scan start signals FLM1 to FLM4 may be supplied to the first to fourth scan drivers 220 to 280, respectively. Widths and supply timings of the first to fourth scan start signals FLM1 to FLM4 may be determined according to driving conditions of the pixel PX and frame frequencies.

The first scan driver 220 may sequentially supply the first scan signal to the first scan lines S11 to S1*n* in response to the first scan start signal FLM1. The second scan driver 240 may sequentially supply the second scan signal to the second scan lines S21 to S2*n* in response to the second scan start signal FLM2. The third scan driver 260 may sequentially supply the third scan signal to the third scan lines S31 to S3*n* in response to the third scan start signal FLM3. The fourth scan driver 280 may sequentially supply the fourth scan signal to the fourth scan lines S41 to S4*n* in response to the fourth scan start signal FLM4.

Figure 5:
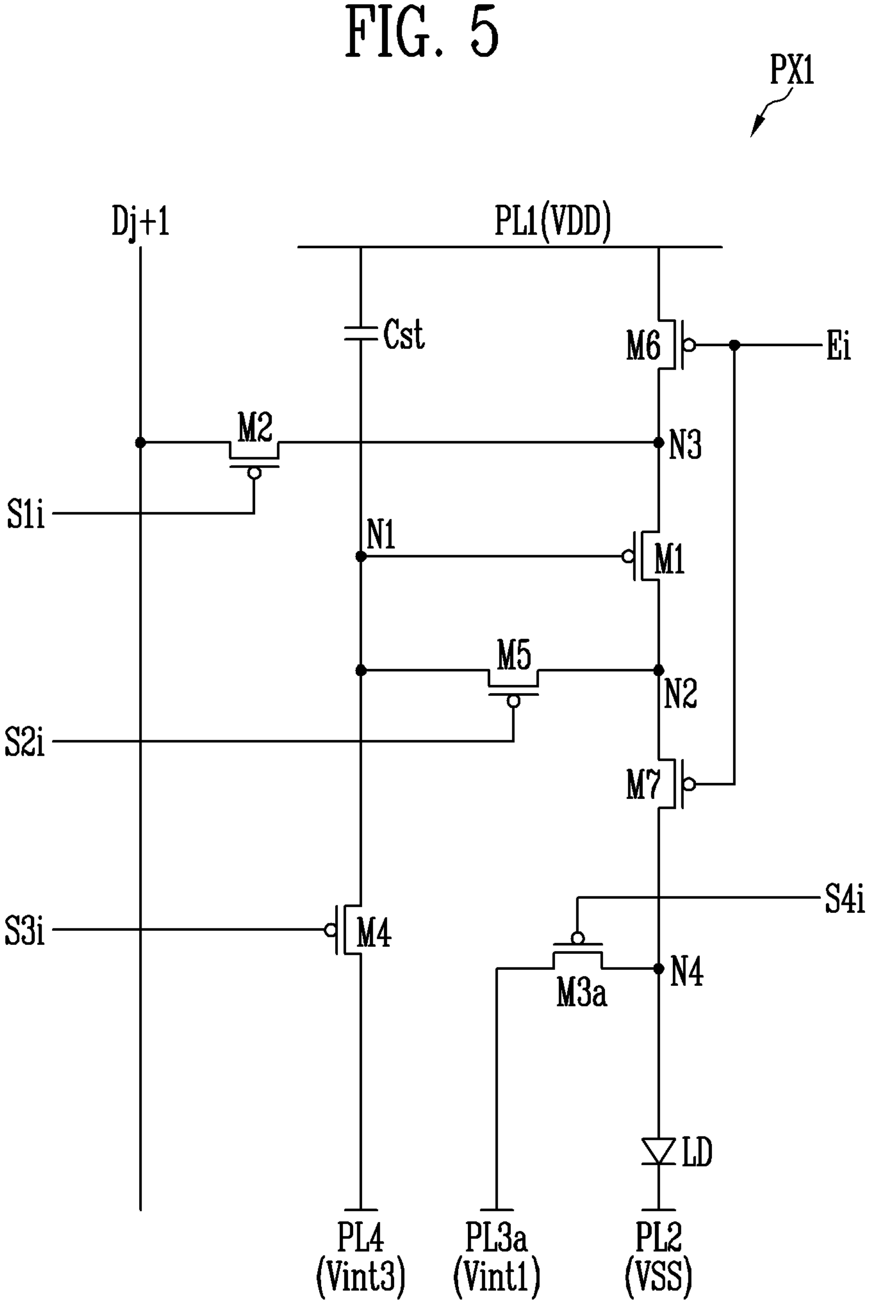
FIG. 5 is a diagram illustrating a first pixel according to an embodiment of the present inventive concept.
Figure 6:
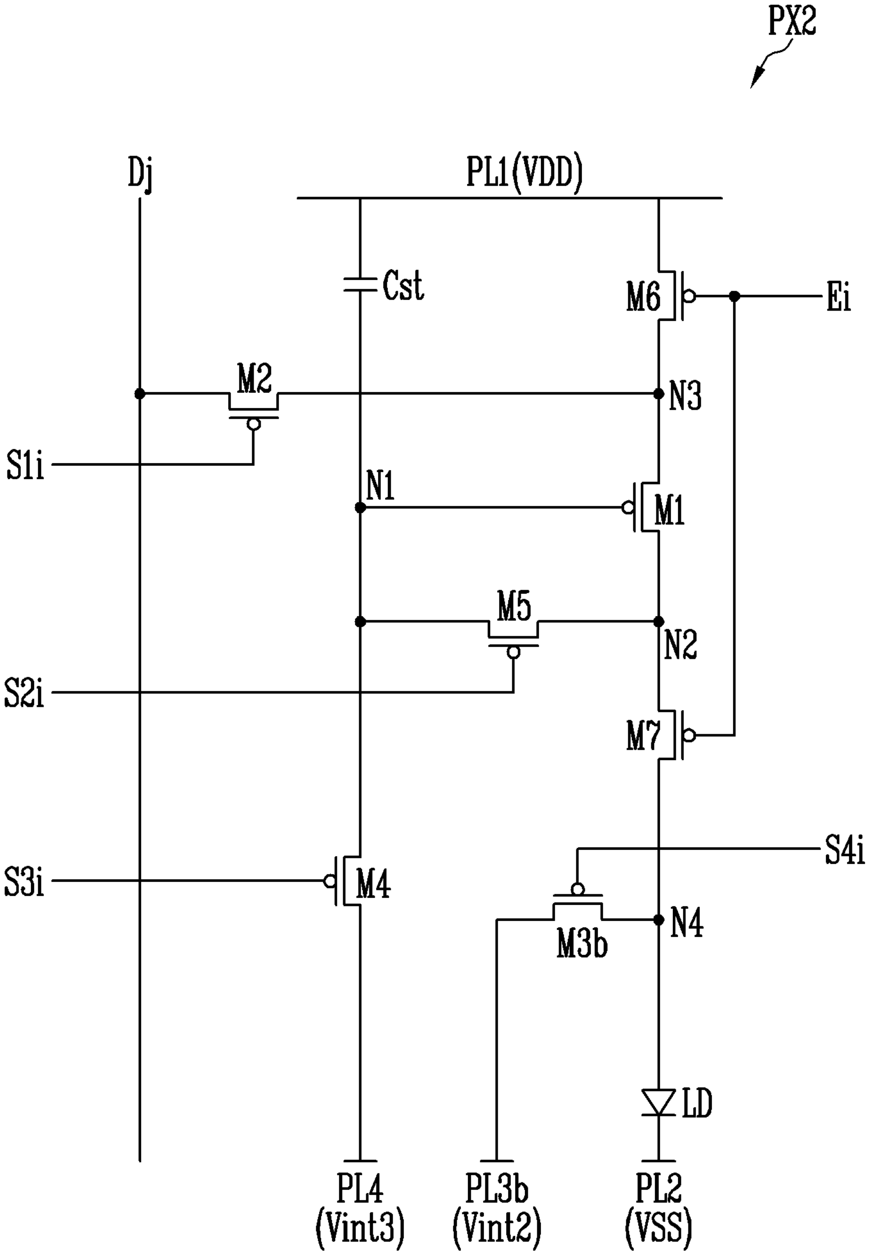
FIG. 6 is a diagram illustrating a second pixel according to an embodiment of the present inventive concept.

FIG. 5 is a diagram illustrating a first pixel according to an embodiment of the present inventive concept. FIG. 6 is a diagram illustrating a second pixel according to an embodiment of the present inventive concept. In FIG. 5, for convenience of description, a first pixel PX1 positioned on an i-th horizontal line (or i-th pixel row) and connected to a (j+1) th data line Dj+1 is shown, where i and j are positive integers. In FIG. 6, for convenience of description, a second pixel PX2 positioned on the i-th horizontal line and connected to a j-th data line Dj is shown. When describing FIG. 6, a description overlapping with that of FIG. 5 will be omitted for convenience of explanation.

Referring to FIG. 5, the first pixel PX1 according to an embodiment of the present inventive concept includes a light emitting element LD and a pixel circuit that controls the amount of current supplied to the light emitting element LD.

A first electrode (or anode electrode) of the light emitting element LD may be connected to the first power source line PL1 to which the first driving power source VDD is supplied via a fourth node N4, a seventh transistor M7, a first transistor M1, and a sixth transistor M6. A second electrode (or cathode electrode) of the light emitting element LD may be connected to the second power source line PL2 to which the second driving power source VSS is supplied. The light emitting element LD may generate light having a predetermined luminance in response to the amount of current supplied from the first transistor M1.

The light emitting element LD may be, for example, an organic light emitting diode. In addition, the light emitting element LD may be an inorganic light emitting diode such as, for example, a micro light emitting diode (LED) or a quantum dot light emitting diode. In addition, the light emitting element LD may be an element composed of a combination of an organic material and an inorganic material. FIG. 5 shows an embodiment in which the pixel PX includes a single light emitting element LD. However, embodiments of the present inventive concept are not limited thereto. For example, in an embodiment, the pixel PX may include a plurality of light emitting elements, and the plurality of light emitting elements may be connected in serial, in parallel, or in series and parallel.

The pixel circuit may include first to seventh transistors M1 to M7 and a storage capacitor Cst.

A first electrode of the first transistor M1 (or driving transistor) may be connected to a third node N3, and a second electrode of the first transistor M1 may be connected to a second node N2. In addition, a gate electrode of the first transistor M1 may be connected to a first node N1. The first transistor M1 may control the amount of current supplied from the first driving power source VDD to the second driving power source VSS via the light emitting element LD in response to a voltage of the first node N1. To this end, the first driving power source VDD may be set to a higher voltage than the second driving power source VSS.

The second transistor M2 may be connected between a data line Dj+1 and the third node N3. In addition, a gate electrode of the second transistor M2 may be connected to a first scan line S1*i*.

The second transistor M2 may be turned on when the first scan signal is supplied to the first scan line S1*i* to electrically connect the data line Dj+1 and the third node N3.

The fifth transistor M5 may be connected between the first node N1 and the second node N2. In addition, a gate electrode of the fifth transistor M5 may be connected to a second scan line S2*i*. The fifth transistor M5 may be turned on when the second scan signal is supplied to the second scan line S2*i* to electrically connect the first node N1 and the second node N2. When the fifth transistor M5 is turned on, the first transistor M1 may be connected in a diode form.

The fourth transistor M4 may be connected between the first node N1 and the fourth power source line PL4 to which the third initialization power source Vint3 is supplied. In addition, a gate electrode of the fourth transistor M4 may be connected to a third scan line S3*i*. The fourth transistor M4 may be turned on when the third scan signal is supplied to the third scan line S3*i* to supply a voltage of the third initialization power source Vint3 to the first node N1. Here, the voltage of the third initialization power source Vint3 may be set to a voltage lower than that of the data signal supplied to the data line Dj+1.

The sixth transistor M6 may be connected between the first power source line PL1 to which the first driving power source VDD is supplied and the third node N3. In addition, a gate electrode of the sixth transistor M6 may be connected to an emission control line Ei. The sixth transistor M6 may be turned off when the emission control signal is supplied to the emission control line Ei, and may be turned on in other cases.

The seventh transistor M7 may be connected between the second node N2 and the fourth node N4. In addition, a gate electrode of the seventh transistor M7 may be connected to the emission control line Ei. The seventh transistor M7 may be turned off when the emission control signal is supplied to the emission control line Ei, and may be turned on in other cases. FIG. 5 shows an embodiment in which the sixth transistor M6 and the seventh transistor M7 are connected to the same emission control line Ei, but the embodiments of present inventive concept are not limited thereto. In an embodiment, the sixth transistor M6 and the seventh transistor M7 may be connected to different emission control lines.

A third transistor M3*a* may be connected between the fourth node N4 and the 3*a*-th power source line PL3*a* to which the first initialization power source Vint1 is supplied. In addition, a gate electrode of the third transistor M3*a* may be connected to a fourth scan line S4*i*. The third transistor M3*a* may be turned on when the fourth scan signal is supplied to the fourth scan line S4*i* to supply the voltage of the first initialization power source Vint1 to the fourth node N4.

The storage capacitor Cst may be connected between the first power source line PL1 and the first node N1. The storage capacitor Cst may store a voltage applied to the first node N1.

As an embodiment, in FIG. 5, the first to seventh transistors M1 to M7 are shown as P-type transistors (for example, PMOS transistors), but embodiments of the present inventive concept are not limited thereto. As an example, at least one of the first to seventh transistors M1 to M7 may be formed as an N-type transistor (for example, an NMOS transistor).

Referring to FIG. 6, the second pixel PX2 according to an embodiment of the present inventive concept may include a light emitting element LD and a pixel circuit that controls the amount of current supplied to the light emitting element LD.

A third transistor M3*b* included in the second pixel PX2 may be connected between the fourth node N4 and the 3*b*-th power source line PL3*b* to which the second initialization power source Vint2 is supplied. In addition, a gate electrode of the third transistor M3*b* may be connected to the fourth scan line S4*i*. The third transistor M3*b* may be turned on when the fourth scan signal is supplied to the fourth scan line S4*i* to supply the voltage of the second initialization power source Vint2 to the fourth node N4.

In an embodiment, the first electrode of the light emitting element LD included in the first pixel PX1 may be initialized by the voltage of the first initialization power source Vint1, and the first electrode of the light emitting element LD included in the second pixel PX2 may be initialized by the voltage of the second initialization power source Vint2.

When the voltage of the first initialization power source Vint1 or the second initialization power source Vint2 is supplied to the first electrode of the light emitting element LD, a parasitic capacitance of the light emitting element LD may be discharged. As a residual voltage charged in the parasitic capacitance of the light emitting element LD is discharged, unintended fine light emitting can be prevented or reduced.

In an embodiment, the first initialization power source Vint1 may be set to a lower voltage than the second initialization power source Vint2. As an example, the first initialization power source Vint1 may be set to a lower voltage than the second driving power source VSS. When the first initialization power source Vint1 is set to a lower voltage than the second initialization power source Vint2, the light emitting element LD included in the first pixel PX1 may be initialized with a lower voltage than the light emitting element LD included in the second pixel PX2. Accordingly, the first pixel PX1 and the second pixel PX2 may implement the same or similar black luminance.

As an example, when the black data signal of the same voltage is supplied to the first pixel PX1 and the second pixel PX2, a first leakage current may be supplied to the light emitting element LD of the first pixel PX1, and a second leakage current may be supplied to the light emitting element LD of the second pixel PX2. Here, the first driving current may be set to a higher current value than the second driving current.

As an example, the light emitting element LD of the first pixel PX1 may be initialized by the voltage of the first initialization power source Vint1 of about −5V, and the light emitting element LD of the second pixel PX2 may be initialized by the voltage of the second initialization power source Vint2 of about −4V. That is, a voltage of the light emitting element LD of the first pixel PX1 may be increased by the first driving current from the voltage of about −5V, and a voltage of the light emitting element LD of the second pixel PX2 may be increased by the second driving current from the voltage of about −4V. In this case, the first pixel PX1 and the second pixel PX2 may implement the same or similar black luminance.

Figure 7A:
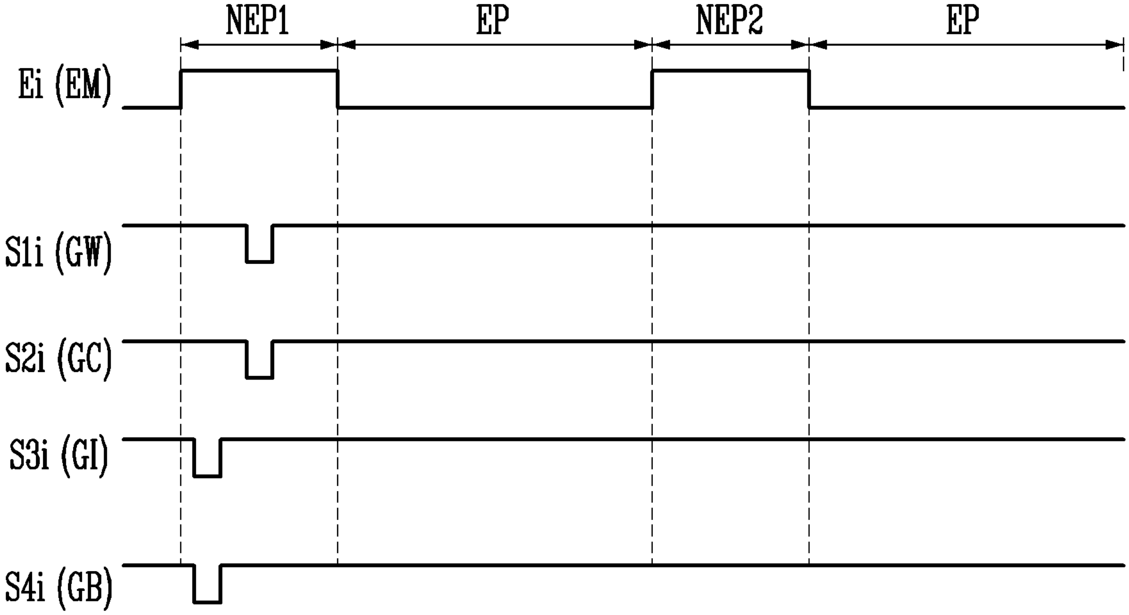
FIGS. 7A and 7B are timing diagrams illustrating embodiments of signals supplied to the first pixel and the second pixel in one frame period.
Figure 7B:
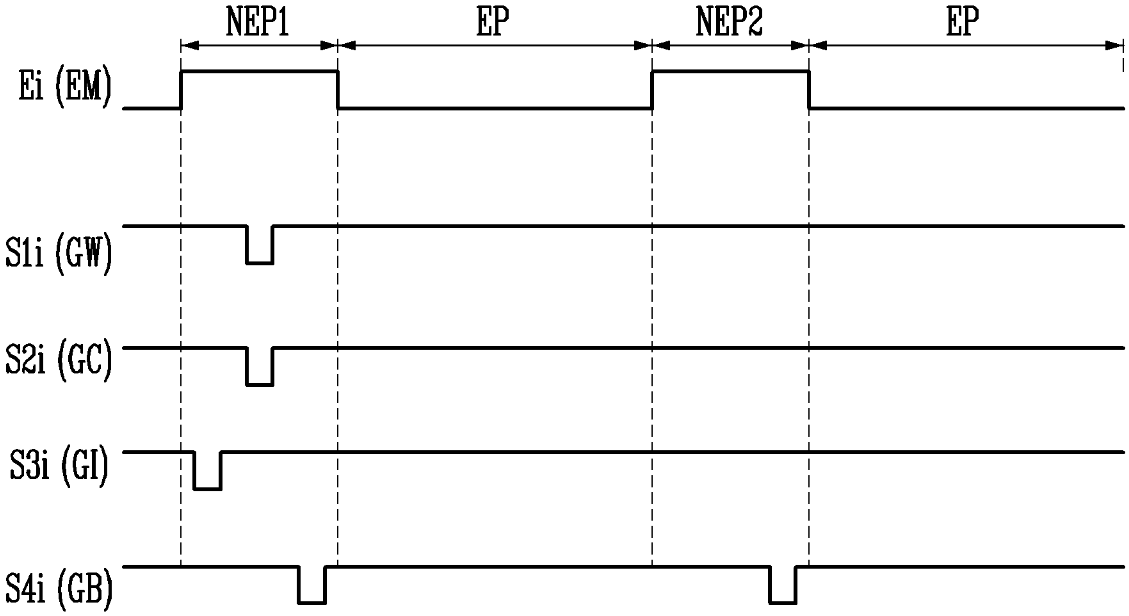

FIGS. 7A and 7B are timing diagrams illustrating embodiments of signals supplied to the first pixel and the second pixel in one frame period.

Referring to FIG. 7A, one frame period may include an emission period EP, a first non-emission period NEP1, and a second non-emission period NEP2. The emission period EP may be adjacent to each of the first non-emission period NEP1 and the second non-emission period NEP2. For example, the emission period EP may be between the first non-emission period NEP1 and the second non-emission period NEP2.

FIG. 7A shows an example in which two non-emission periods NEP1 and NEP2 are included in one frame period, but embodiments of the present inventive concept are not limited thereto. For example, the number of non-emission periods NEP1 and NEP2 included in one frame period may be set in various ways according to the frame frequency and/or setting of the display device 1000 according to embodiments.

The first non-emission period NEP1 may mean a period in which the data signal is written. The second non-emission period NEP2 may mean a period in which the pixel PX does not emit light while a previous data signal is maintained. As described above, when a plurality of non-emission periods are included in one frame period, motion blur and the like can be reduced, and thus, the image quality of a moving image can be increased.

The emission control signal EM may be supplied a plurality of times during one frame period. That is, the emission control signal EM may have an off period corresponding to the first non-emission period NEP1 and the second non-emission period NEP2. Here, the off period of the emission control signal may mean a period during which the emission control signal is supplied and the sixth transistor M6 and the seventh transistor M7 are turned off accordingly.

Describing an operation process, first, during the first non-emission period NEP1, the sixth transistor M6 and the seventh transistor M7 may be turned off by the emission control signal EM supplied to the emission control line Ei. When the sixth transistor M6 and the seventh transistor M7 are turned off, an electrical connection between the first power source line PL1 and the light emitting element LD may be cut off, and thus, the light emitting element LD may be set to a non-light emitting state.

Thereafter, a third scan signal GI may be supplied to the third scan line S3*i*, and a fourth scan signal GB may be supplied to the fourth scan line S4*i*. When the third scan signal GI is supplied to the third scan line S3*i*, the fourth transistor M4 may be turned on, and when the fourth scan signal GB is supplied to the fourth scan line S4*i*, the third transistor M3*a* or M3*b* may be turned on.

When the fourth transistor M4 is turned on, the voltage of the third initialization power source Vint3 may be supplied to the first node N1. Accordingly, the first node N1 may be initialized with the voltage of the third initialization power source Vint3. When the third transistor M3*a* included in the first pixel PX1 is turned on, the voltage of the first initialization power source Vint1 may be supplied to the fourth node N4. Accordingly, the first electrode of the light emitting element LD may be initialized with the voltage of the first initialization power source Vint1. When the third transistor M3*b* included in the second pixel PX2 is turned on, the voltage of the second initialization power source Vint2 may be supplied to the fourth node N4. Accordingly, the first electrode of the light emitting element LD may be initialized with the voltage of the second initialization power source Vint2. Here, the fourth scan signal GB supplied to the fourth scan line S4*i* may be set as the first scan signal supplied to a first scan line S1*i*−1 positioned on a previous horizontal line. Also, the fourth scan signal GB supplied to the fourth scan line S4*i* may be set as the same scan signal as the third scan signal GI.

Thereafter, a first scan signal GW may be supplied to the first scan line S1*i* and a second scan signal GC may be supplied to the second scan line S2*i*. When the first scan signal GW is supplied to the first scan line S1*i*, the second transistor M2 may be turned on. When the second scan signal GC is supplied to the second scan line S2*i*, the fifth transistor M5 may be turned on. Here, the second scan signal GC may be set as the same scan signal as the first scan signal GW.

When the second transistor M2 is turned on, the data line Dj or Dj+1 and the third node N3 may be electrically connected to each other. Accordingly, the data signal may be supplied to the third node N3 from the data line Dj or Dj+1. When the fifth transistor M5 is turned on, the first transistor M1 may be connected in a diode form. In this case, the data signal supplied to the third node N3 may be supplied to the first node N1 via the first transistor M1 connected in a diode form. Accordingly, a voltage corresponding to the data signal and a threshold voltage of the first transistor M1 may be applied to the first node N1. The storage capacitor Cst may store the voltage applied to the first node N1.

After the voltage corresponding to the data signal and the threshold voltage of the first transistor M1 is stored in the storage capacitor Cst, the supply of the emission control signal EM may be stopped. When the supply of the emission control signal EM is stopped, the sixth transistor M6 and the seventh transistor M7 may be turned on. When the sixth transistor M6 and the seventh transistor M7 are turned on, the first power source line PL1 may be electrically connected to the first electrode of the light emitting element LD via the sixth transistor M6, the first transistor M1, and the seventh transistor M7. In this case, the first transistor M1 may supply a driving current corresponding to the voltage applied to the first node N1 to the light emitting element LD, and the light emitting element LD may emit light with a luminance corresponding to the driving current. That is, the light emitting element LD may emit light with a luminance corresponding to the driving current during the emission period EP after the first non-emission period NEP1.

During the second non-emission period NEP2, the emission control signal EM may be supplied to the emission control line Ei. Accordingly, the sixth transistor M6 and the seventh transistor M7 may be turned off. When the sixth transistor M6 and the seventh transistor M7 are turned off, electrical connection between the first power source line PL1 and the light emitting element LD may be cut off. Accordingly, the light emitting element LD may be set to the non-light emitting state.

In an embodiment, during the second non-emission period NEP2, the scan signals GW, GC, GI, and GB are not supplied. Accordingly, the storage capacitor Cst may maintain the voltage stored in the first non-emission period NEP1. During the emission period EP following the second non-emission period NEP2, the supply of the emission control signal EM may be stopped so that the sixth transistor M6 and the seventh transistor M7 may be turned on. Then, during the emission period EP following the second non-emission period NEP2, the light emitting element LD may emit light with a luminance corresponding to the driving current.

In an embodiment of the present inventive concept, a waveform to which the scan signal is supplied to drive the pixel PX may be variously changed. As an example, as shown in FIG. 7B, after the first scan signal GW is supplied to the first scan line S1*i* during the first non-emission period NEP1, the fourth scan signal GW may be supplied to the fourth scan line S4*i*. Also, the fourth scan signal GB may be supplied to the fourth scan line S4*i* during the second non-emission period NEP2.

When the fourth scan signal GB is supplied to the fourth scan line S4*i* during the second non-emission period NEP2, the third transistor M3*a* or M3*b* may be turned on. Accordingly, the first electrode of the light emitting element LD included in the first pixel PX1 may be initialized with the voltage of the first initialization power source Vint1, and the first electrode of the light emitting element LD included in the second pixel PX2 may be initialized with the voltage of the second initialization power source Vint2.

Figure 8:
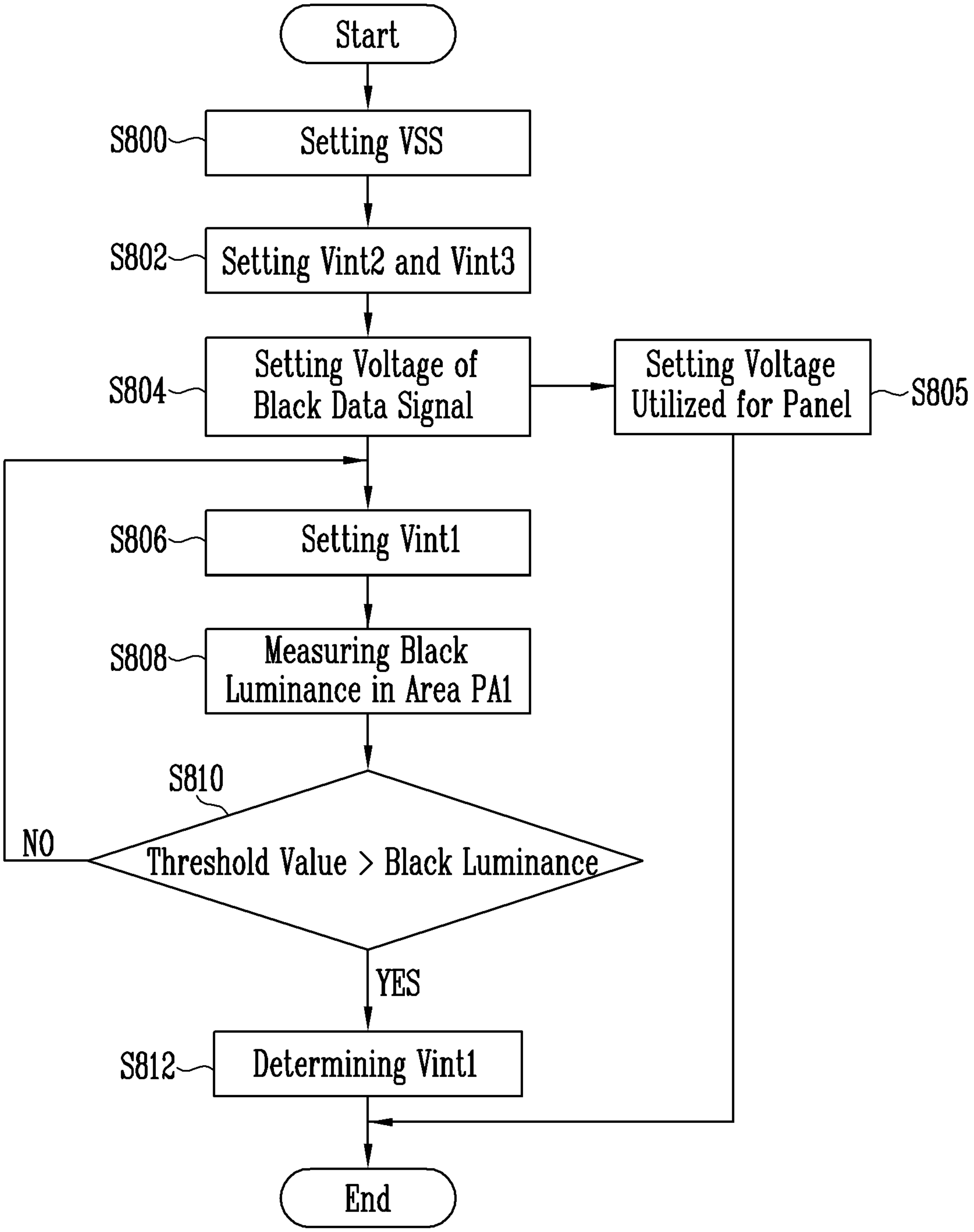
FIG. 8 is a flowchart for explaining a method of setting a voltage according to an embodiment of the present inventive concept.

FIG. 8 is a flowchart for explaining a method of setting a voltage according to an embodiment of the present inventive concept. A process of setting the voltage of FIG. 8 may be performed during a manufacturing process.

Referring to FIG. 8, first, a voltage of the second driving power source VSS may be set in consideration of characteristics of the display panel 10 (S800). After the voltage of the second driving power source VSS is set, voltages of the second initialization power source Vint2 and the third initialization power source Vint3 may be set in consideration of the voltage of the second driving power source VSS (S802).

After the voltages of the second initialization power source Vint2 and the third initialization power source Vint3 are set, the voltage of the black data signal may be set (S804). The voltage of the black data signal may be set to the same voltage in the first pixel area PA1 and the second pixel area PA2. The voltage of the black data signal may be set based on the second pixel PX2.

After the voltage of the black data signal is set in operation S804, various voltages utilized for the display panel 10 such as, for example, the gate-off voltage VGH, the voltage of the driving power source AVDD, and the like may be set (S805). The gate-off voltage VGH may be set to the same voltage in the first pixel area PA1 and the second pixel area PA2.

After the voltage of the black data signal is set in operation S804, the voltage of the first initialization power source Vint1 may be set (S806). The first initialization power source Vint1 may be set to a voltage different from that of the second initialization power source Vint2. In an embodiment, the first initialization power source Vint1 may be set to a lower voltage than the second initialization power source Vint2. In an embodiment, the first initialization power source Vint1 may be set to a lower voltage than the second driving power source VSS.

After the voltage of the first initialization power source Vint1 is set, the black luminance of the first pixel area PA1 may be measured, and it may be determined whether the measured luminance is less than or equal to a threshold value (S808 and S810). Here, the threshold value may mean a luminance as a criterion for determining black, and may be set to, for example, about 0.001 nit or less.

When the black luminance is set to be about equal to or greater than the threshold value in operation S810, the voltage of the first initialization power source Vint1 may be set while repeating operations S806 to S810. When the black luminance is less than the threshold value in operation S810, the voltage of the first initialization power source Vint1 may be determined (S812).

Figure 9:
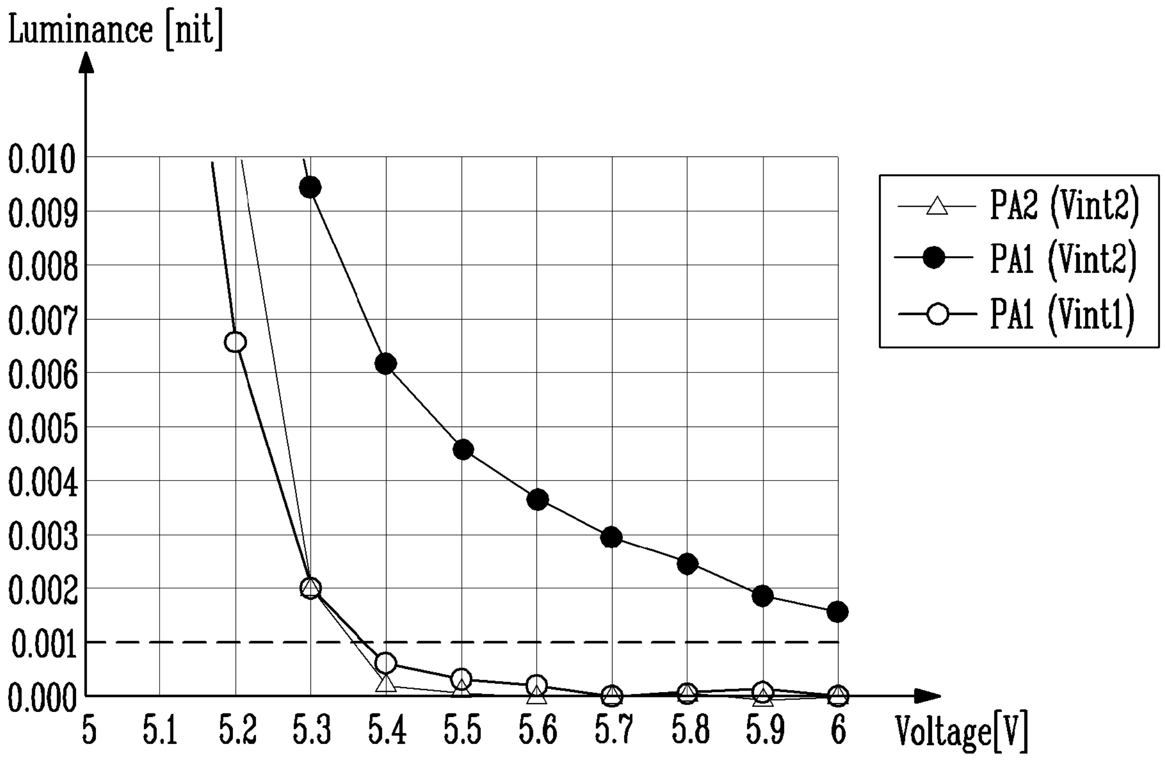
FIG. 9 is a diagram illustrating black luminance in a first pixel area and a second pixel area corresponding to a voltage of a black data signal.

FIG. 9 is a diagram illustrating black luminance in a first pixel area and a second pixel area corresponding to a voltage of a black data signal. In FIG. 9, PA1 (Vint2) represents a case in which the voltage of the second initialization power source Vint2, which is the same as in the second pixel area PA2, is supplied to the first pixel area PA1, and PA1 (Vint1) represents a case in which the voltage of the first initialization power source Vint1 lower than that of the second initialization power source Vint2 is supplied to the first pixel area PA1.

In FIG. 9, the X-axis represents the voltage of the black data signal. In the display device 1000, the black data signal may be set to a voltage of about 6V or higher. In FIG. 9, the Y-axis represents the luminance of the pixel unit 100 corresponding to the black data signal. When the luminance of the pixel unit 100 is set to about 0.001 nit (or the threshold value) or less in response to the black data signal, it may be determined that the desired black luminance is implemented.

Referring to FIG. 9, the data driver 400 may supply the black data signal of the same voltage to the first pixel area PA1 and the second pixel area PA2. Here, the voltage of the black data signal may be a voltage set based on the second pixel PX2. When the voltage of the second initialization power source Vint2 is supplied to the first pixel PX1 and the second pixel PX2, the second pixel PX2 may stably implement the black luminance. On the other hand, in the first pixel PX1 supplied with the second initialization power source Vint2, luminance equal to or higher than the threshold value may be displayed in response to the black data signal. That is, the first pixel PX1 supplied with the second initialization power source Vint2 may not be able to implement the black luminance.

In an embodiment, the first pixel PX1 supplied with the first initialization power source Vint1 may display luminance less than the threshold value in response to the black data signal. As an example, corresponding to the voltage of the black data signal of about 5.4V or higher, the first pixel PX1 may stably implement the black luminance. In addition, the first pixel PX1 supplied with the first initialization power source Vint1 may implement the same or similar black luminance as the second pixel PX2 supplied with the second initialization power source Vint2.

Figure 10:
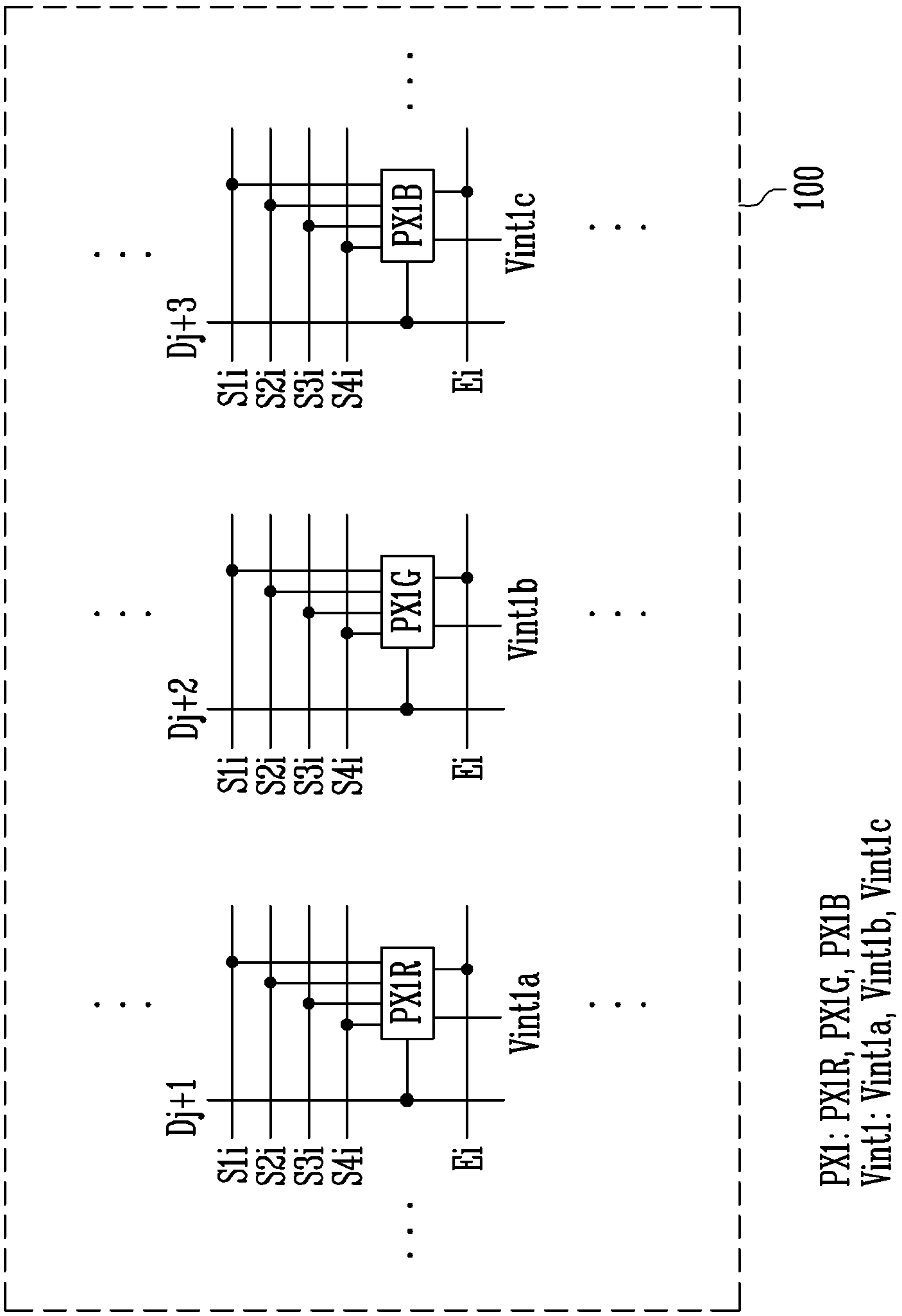
FIG. 10 is a diagram illustrating first pixels according to an embodiment of the present inventive concept.

FIG. 10 is a diagram illustrating first pixels according to an embodiment of the present inventive concept.

Referring to FIG. 10, the first pixel PX1 may include a first pixel PX1R that emits light of a first color (or a first pixel of a first color), a first pixel PX1G that emits light of a second color (or a first pixel of a second color), and a first pixel PX1B that emits light of a third color (or a first pixel of a third color).

The first color, the second color, and the third color may be different colors. For example, the first color may be one color among red, green, and blue, the second color may be one color other than the first color among red, green, and blue, and the third color may be one color other than the first color and the second color among red, green, and blue. Also, magenta, cyan, and yellow may be used instead of red, green, and blue as the first to third colors according to embodiments.

The first pixel PX1R of the first color, the first pixel PX1G of the second color, and the first pixel PX1B of the third color may be supplied with the first initialization power source Vint1 of different voltages. As an example, the first pixel PX1R of the first color may be supplied with a 1*a*-th initialization power source Vint1*a*, the first pixel PX1G of the second color may be supplied with a 1*b*-th initialization power source Vint1*b*, and the first pixel PX1B of the third color may be supplied with a 1*c*-th initialization power source Vint1*c*.

Here, the 1*a*-th initialization power source Vint1*a*, the 1*b*-th initialization power source Vint1*b*, and the 1*c*-th initialization power source Vint1*c* may be set to different voltages. As an example, voltages of the 1*a*-th initialization power source Vint1*a*, the 1*b*-th initialization power source Vint1*b*, and the 1*c*-th initialization power source Vint1*c* may be respectively set through the process described with reference to FIG. 8 so that the black luminance can be implemented.

As such, when first initialization power sources Vint1 of different voltages are supplied to the first pixel PX1R of the first color, the first pixel PX1G of the second color, and the first pixel PX1B of the third color, voltages of the first initialization power sources Vint1 may be set by reflecting material characteristics of the first pixel PX1R of the first color, the first pixel PX1G of the second color, and the first pixel PX1B of the third color, respectively. Accordingly, the black luminance may be stably implemented.

Additionally, voltages of the 1*a*-th initialization power source Vint1*a*, the 1*b*-th initialization power source Vint1*b*, and the 1*c*-th initialization power source Vint1*c* may be changed in response to temperatures. As an example, as the temperature increases, the 1*a*-th initialization power source Vint1*a*, the 1*b*-th initialization power source Vint1*b*, and the 1*c*-th initialization power source Vint1*c* may be set to lower voltages. Then, it is possible to prevent, reduce or minimize the colors of the first pixel PX1R of the first color, the first pixel PX1G of the second color, and the first pixel PX1B of the third color from being changed (or color shifted) in response to the temperature characteristics.

According to the display device and the method of driving the same according to embodiments of the present inventive concept, a lower initialization power source may be supplied to a first pixel area having a lower resolution than a second pixel area having a higher resolution. Accordingly, the desired black luminance can be implemented in the first pixel area.

Also, according to the display device and the method of driving the same according to embodiments of the present inventive concept, a black data signal of the same voltage may be supplied to the first pixel area and the second pixel area. Accordingly, power consumption can be minimized or reduced.

However, effects of the present inventive concept are not limited to the above-described effects, and may be variously extended without departing from the spirit and scope of the present inventive concept.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A display device, comprising: a plurality of first pixels disposed in a first pixel area and initialized by a voltage of a first initialization power source; a plurality of second pixels disposed in a second pixel area and initialized by a voltage of a second initialization power source different from the first initialization power source; a data driver that supplies a data signal to a plurality of data lines connected to the first pixels and the second pixels; and a scan driver that supplies a scan signal to a plurality of scan lines connected to the first pixels and the second pixels, wherein a black data signal supplied from the data driver to the first pixels and a black data signal supplied from the data driver to the second pixels are set to a same voltage, wherein the first pixels comprise pixels of a first color and pixels of a second color, and wherein the voltage of the first initialization power source supplied to the pixels of the first color and the voltage of the first initialization power source supplied to the pixels of the second color are set to be different from each other, wherein the voltage of the first initialization power source supplied to the pixels of the first color and the voltage of the first initialization power source supplied to the pixels of the second color are set to be different from each other in response to a different temperature.

2. The display device of claim 1, wherein a number of the first pixels disposed per unit area is less than a number of the second pixels disposed per unit area.

3. The display device of claim 2, wherein the first initialization power source is set to a lower voltage than the second initialization power source.

4. The display device of claim 1, wherein the scan driver generates the scan signal supplied to the first pixels and the second pixels using a same gate-off voltage.

5. The display device of claim 1, wherein each of the first pixels and the second pixels comprises:

a light emitting element having a second electrode connected to a second power source line to which a second driving power source is supplied;

a first transistor that controls an amount of current supplied from a first driving power source of a first power source line connected to a first electrode to the second power source line via the light emitting element;

a second transistor connected between a data line among the plurality of data lines and the first electrode of the first transistor and having a gate electrode connected to a first scan line among the plurality of scan lines; and a third transistor connected between a first electrode of the light emitting element and a third power source line.

6. The display device of claim 5, wherein the first initialization power source is supplied to the third power source line of a first pixel among the plurality of first pixels, and the second initialization power source is supplied to the third power source line of a second pixel among the plurality of second pixels.

7. The display device of claim 5, wherein the first initialization power source is set to a lower voltage than the second driving power source.

8. The display device of claim 5, wherein each of the first pixels and the second pixels comprises:

a fourth transistor connected between a gate electrode of the first transistor and a fourth power source line to which a voltage of a third initialization power source is supplied, and having a gate electrode connected to a third scan line among the plurality of scan lines;

a fifth transistor connected between the gate electrode of the first transistor and a second electrode of the first transistor, and having a gate electrode connected to a second scan line among the plurality of scan lines;

a sixth transistor connected between the first power source line and the first electrode of the first transistor, and having a gate electrode connected to an emission control line;

a seventh transistor connected between the second electrode of the first transistor and the first electrode of the light emitting element, and having a gate electrode connected to the emission control line; and a storage capacitor connected between the gate electrode of the first transistor and the first power source line.

9. The display device of claim 1, wherein each of the voltage of the first initialization power source supplied to the pixels of the first color and the voltage of the first initialization power source supplied to the pixels of the second color is set to a lower voltage as the temperature increases.

10. The display device of claim 1, wherein the first pixels further comprise pixels of a third color, and the voltage of the first initialization power source supplied to the pixels of the third color is set to be different from the voltage of the first initialization power source supplied to the pixels of the first color and the voltage of the first initialization power source supplied to the pixels of the second color.

11. A method of driving a display device, comprising: initializing a light emitting element included in each of a plurality of first pixels disposed in a first pixel area while supplying a voltage of a first initialization power source; and initializing a light emitting element included in each of a plurality of second pixels disposed in a second pixel area while supplying a voltage of a second initialization power source different from the first initialization power source, wherein a voltage of a black data signal supplied to the first pixels and a voltage of a black data signal supplied to the second pixels are set to be the same wherein the first pixels comprise pixels of a first color and pixels of a second color, and wherein the voltage of the first initialization power source supplied to the pixels of the first color and the voltage of the first initialization power source supplied to the pixels of the second color are set to be different from each other, wherein the voltage of the first initialization power source supplied to the pixels of the first color and the voltage of the first initialization power source supplied to the pixels of the second color are set to be different from each other in response to a different temperature.

12. The method of claim 11, wherein a number of the first pixels disposed per unit area is less than a number of the second pixels disposed per unit area.

13. The method of claim 12, wherein the first initialization power source is set to a lower voltage than the second initialization power source.

14. The method of claim 11, wherein a scan signal supplied to the first pixels and a scan signal supplied to the second pixels are generated by a same gate-off voltage.

15. The method of claim 11, wherein each of the first pixels implements a luminance while controlling an amount of current flowing from a voltage of a first driving power source to a second driving power source via the light emitting element, and wherein the first initialization power source is set to a lower voltage than the second driving power source.

16. The method of claim 11, wherein the voltage of the first initialization power source supplied to the pixels of the first color and the voltage of the first initialization power source supplied to the pixels of the second color are set to a lower voltage as a temperature increases.

* * * * *